CHARLES P. WINSLOW, OF WESTBOROUGH, MASSACHUSETTS.

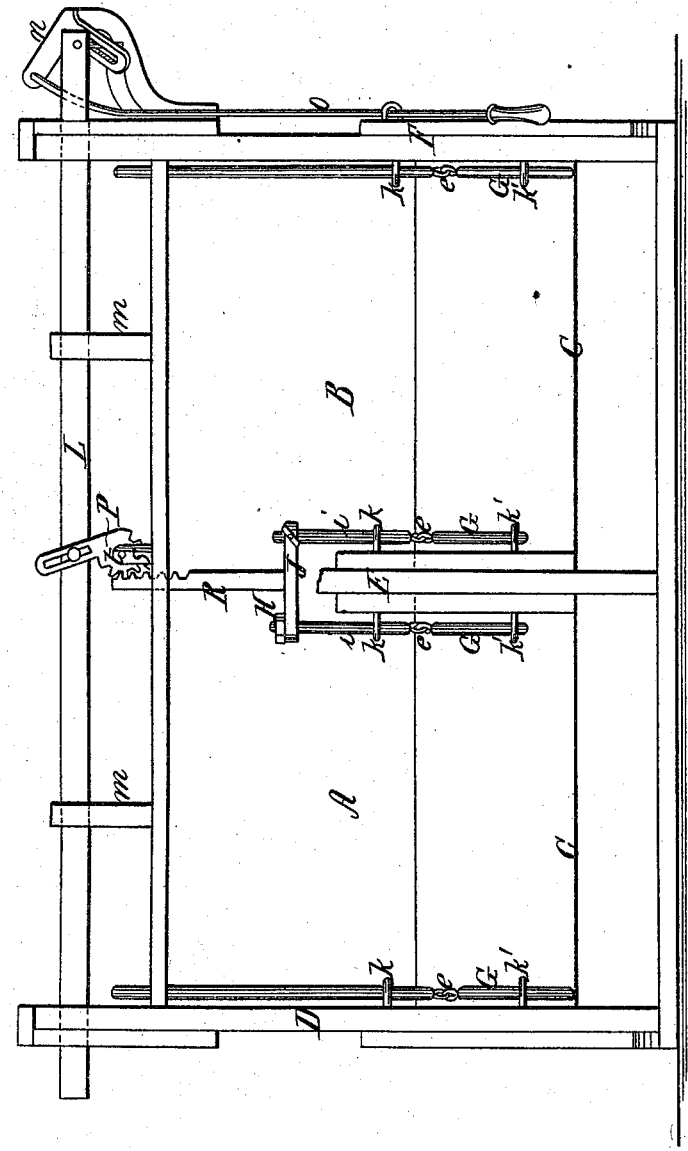

Letters Patent No. 87,454, dated March 2, 1869.

IMPROVEMENT IN SAFETY CATTLE-TIE.

The Schedule referred to in these Letters Patent and making part of the same.

*To all whom it may concern:*

Be it known that I, CHARLES P. WINSLOW, of Westborough, in the county of Worcester, and State of Massachusetts, have invented a new and useful Improvement in Safety Cattle-Tie; and I do hereby declare that the following is a full, clear, and exact description thereof, which will enable others skilled in the art to make and use the same, reference being had to the accompanying drawing, forming part of this specification.

The object of this invention is to provide means for releasing cattle, horses, or other animals, which are tied in barns or stables, in case of fire, and thereby enabling them to escape; and It consists in the arrangement of adjustable or movable tie-bolts in the stalls to which each animal is secured, in such a manner that they may be simultaneously moved and the animals released from their respective ties, and allowed to escape, as will be hereinafter more fully described.

The accompanying plate of drawings represents the heads of two stalls of a stable, provided with my safety-tying arrangement.

The stalls are marked A and B, and may be increased in number, as may be required, two being deemed sufficient to illustrate my invention.

C represents the mangers.

The stable may be divided or partitioned off in any desired or convenient manner, but with uprights between the stalls to support the tie-bolts, as represented in the drawing by the letters D, E, and F.

G represents the tie-bolts, the whole of which are designed to be arranged and operated as those seen connected with the central partition E.

H represents a frame, from the rods $i\,i$ of which the tie-bolts G are suspended, by links or eye-joints $e$, as seen in the drawing.

These rods may be fastened to the cross-piece J, by nuts or set-screws, as may be considered best.

$k\,k'$ represent eyes, which are secured to the partitions. The upper eyes serve as guides for the frame or rods $i\,i$. The lower eyes serve to hold the lower ends of the tie-bolts when the cattle or animals are fastened. The unfastening is done by raising these tie-bolts above the eyes $k'$.

L is a horizontal-sliding bar, running over the manger, supported on studs, $m$, or in any other suitable manner, so that a longitudinal movement may be readily given to it from the outside of the stable, as seen in the drawing, on the right hand, where provision is made for sliding the bar by a bell-crank, $n$, and rod $o$. One leg of the bell-crank is slotted, through which a pin on the bar passes, while the rod $o$ is connected with the other leg.

The longitudinal motion of the bar serves to raise the frame H and the tie-bolts G, by means of the lever-pinion P and the rack R, the former being connected with and supported by the stud S, on a pin, $t$, and the latter being connected with the frame H, as seen in the drawing.

It will be seen that by drawing down the rod $o$, on the outside of the stable, the bar will receive a longitudinal motion, and that the frame H and the tie-bolts G, as many as may be connected with the bar, as seen in the drawing, will be raised.

When the tie-bolts are raised from the eyes $k'$, they will swing on their joint-eyes or links $e$, and the rope or halter will slip therefrom, thus releasing the animals, and allowing them to escape, by simply opening the door, and without entering the barn or stable for that purpose.

Having thus described my invention,

I claim as new, and desire to secure by Letters Patent—

The arrangement, with reference to the cattle-stalls, of the sliding bar L, lever-pinion P, rods R, cross-piece J, rods $i\,i$, jointed tie-bolts C and the eyes $k\,k'$, as herein described, for the purpose specified.

The above specification of my invention signed by me, this 10th day of December, 1868.

C. P. WINSLOW.

Witnesses:
 FRANK BLOCKLEY,
 ALEX. F. ROBERTS.